United States Patent
Ma et al.

(10) Patent No.: US 11,909,289 B2
(45) Date of Patent: Feb. 20, 2024

(54) VIBRATION MOTOR WITH ELASTIC SUPPORT ARM WITH FLANGE

(71) Applicant: AAC Microtech (Changzhou) Co., Ltd., Changzhou (CN)

(72) Inventors: Jie Ma, Shenzhen (CN); Lubin Mao, Shenzhen (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 234 days.

(21) Appl. No.: 17/533,142

(22) Filed: Nov. 23, 2021

(65) Prior Publication Data

US 2022/0209634 A1 Jun. 30, 2022

(30) Foreign Application Priority Data

Dec. 25, 2020 (CN) .......................... 202023202731.4

(51) Int. Cl.
*H02K 33/02* (2006.01)

(52) U.S. Cl.
CPC .................................. *H02K 33/02* (2013.01)

(58) Field of Classification Search
CPC .. H02K 7/1869; H02K 7/1876; H02K 7/1892; H02K 33/00; H02K 33/02; H02K 33/16; H02K 35/00; H02K 35/02; H02K 33/04; H02K 33/06; H02N 11/00; H02N 11/002; H02N 11/04
USPC ........ 310/15–25, 12.01, 81, 80, 321, 28–30, 310/36–37, 40 MM
See application file for complete search history.

(56) References Cited

U.S. PATENT DOCUMENTS

| | | | | |
|---|---|---|---|---|
| 5,231,337 A * | 7/1993 | van Namen | ........... | H02K 33/18 318/128 |
| 6,323,568 B1 * | 11/2001 | Zabar | ..................... | H02K 33/04 310/12.24 |
| 7,671,493 B2 * | 3/2010 | Takashima | .............. | G06F 3/016 310/15 |
| 7,999,421 B2 * | 8/2011 | Kim | ....................... | H02K 33/18 310/15 |
| 8,269,379 B2 * | 9/2012 | Dong | ..................... | H02K 33/16 310/28 |
| 8,278,786 B2 * | 10/2012 | Woo | ....................... | H02K 33/16 310/15 |
| 8,368,268 B2 * | 2/2013 | Hasegawa | ............ | G02B 21/248 359/381 |
| 8,648,502 B2 * | 2/2014 | Park | ...................... | H02K 33/16 310/15 |
| 8,829,741 B2 * | 9/2014 | Park | ....................... | B06B 1/045 310/25 |

(Continued)

*Primary Examiner* — Maged M Almawri
(74) *Attorney, Agent, or Firm* — W&G Law Group

(57) ABSTRACT

The present invention provides a vibration motor having a housing with an accommodation space; a vibrator; a stator; and an elastic support assembly suspending the vibrator in the accommodation space. The elastic support assembly includes one elastic support between the vibrator and the housing. The elastic support includes a first fixed part, a second fixed part, a first elastic support arm connecting the first fixed part and the second fixed part, and spaced from the vibrator, and a first flange formed by bending and extending from the first elastic support arm. The first flange keeps a distance from the vibrator or the housing. Such a vibration motor has enhanced stiffness.

9 Claims, 8 Drawing Sheets

(56) References Cited

U.S. PATENT DOCUMENTS

| | | | | |
|---|---|---|---|---|
| 8,878,401 B2* | 11/2014 | Lee | | H02K 33/16 310/15 |
| 8,941,272 B2* | 1/2015 | Hong | | H02K 33/18 310/15 |
| 9,024,489 B2* | 5/2015 | Akanuma | | H02K 33/16 310/15 |
| 9,225,265 B2* | 12/2015 | Oh | | G06F 3/016 |
| 9,306,429 B2* | 4/2016 | Akanuma | | H02K 33/16 |
| 9,543,816 B2* | 1/2017 | Nakamura | | H02K 33/00 |
| 9,748,827 B2* | 8/2017 | Dong | | H02K 33/16 |
| 9,948,170 B2* | 4/2018 | Jun | | H02K 33/00 |
| 10,033,257 B2* | 7/2018 | Zhang | | H02K 33/12 |
| 10,063,128 B2* | 8/2018 | Wang | | H02K 33/16 |
| 10,160,010 B2* | 12/2018 | Chun | | H02K 33/16 |
| 10,236,761 B2* | 3/2019 | Wang | | H02K 33/16 |
| 10,307,791 B2* | 6/2019 | Xu | | B06B 1/045 |
| 10,328,461 B2* | 6/2019 | Xu | | B06B 1/045 |
| 10,447,133 B2* | 10/2019 | Jin | | H02K 33/18 |
| 10,483,451 B2* | 11/2019 | Wang | | H10N 30/85 |
| 10,486,196 B2* | 11/2019 | Chai | | B06B 1/045 |
| 10,491,090 B2* | 11/2019 | Zu | | H02K 33/16 |
| 10,547,233 B2* | 1/2020 | Jin | | H02K 5/04 |
| 10,596,594 B2* | 3/2020 | Ling | | H02K 33/02 |
| 10,596,596 B2* | 3/2020 | Ling | | B06B 1/045 |
| 10,674,278 B2* | 6/2020 | Zhou | | H04R 9/025 |
| 10,763,732 B2* | 9/2020 | Liu | | H02K 33/18 |
| 10,847,296 B2* | 11/2020 | Wauke | | H01F 7/126 |
| 10,886,827 B2* | 1/2021 | Liu | | H02K 33/14 |
| 11,050,334 B2* | 6/2021 | Mori | | H02K 33/18 |
| 11,205,937 B2* | 12/2021 | Song | | H02K 41/0354 |
| 11,309,808 B1* | 4/2022 | Li | | H02K 35/02 |
| 2006/0066164 A1* | 3/2006 | Kim | | H02K 7/063 310/81 |
| 2006/0133218 A1* | 6/2006 | Matthey | | B06B 1/045 368/230 |
| 2009/0096299 A1* | 4/2009 | Ota | | B06B 1/045 310/25 |
| 2009/0267423 A1* | 10/2009 | Kajiwara | | H02K 33/02 310/38 |
| 2010/0213773 A1* | 8/2010 | Dong | | H02K 33/16 310/25 |
| 2010/0302752 A1* | 12/2010 | An | | H02K 33/06 361/807 |
| 2011/0006618 A1* | 1/2011 | Lee | | B06B 1/045 310/25 |
| 2011/0018364 A1* | 1/2011 | Kim | | H02K 33/18 310/20 |
| 2011/0068640 A1* | 3/2011 | Choi | | H02K 5/04 310/25 |
| 2011/0089772 A1* | 4/2011 | Dong | | H02K 33/16 310/25 |
| 2011/0115311 A1* | 5/2011 | Dong | | H02K 33/16 310/28 |
| 2011/0133577 A1* | 6/2011 | Lee | | H02K 33/18 310/15 |
| 2011/0156500 A1* | 6/2011 | Dong | | H02K 33/16 310/25 |
| 2011/0266892 A1* | 11/2011 | Wauke | | H02K 33/18 310/25 |
| 2011/0316361 A1* | 12/2011 | Park | | H02K 33/16 310/25 |
| 2012/0153748 A1* | 6/2012 | Wauke | | H02K 33/16 310/25 |
| 2012/0169148 A1* | 7/2012 | Kim | | H02K 33/16 310/25 |
| 2012/0187780 A1* | 7/2012 | Bang | | H02K 33/16 310/25 |
| 2012/0313459 A1* | 12/2012 | Zhang | | H02K 33/18 310/25 |
| 2013/0061736 A1* | 3/2013 | Wauke | | G10H 1/42 84/736 |
| 2013/0099600 A1* | 4/2013 | Park | | B06B 1/045 310/15 |
| 2013/0099602 A1* | 4/2013 | Park | | H02K 33/16 310/25 |
| 2014/0035397 A1* | 2/2014 | Endo | | H02K 33/18 310/30 |
| 2015/0137627 A1* | 5/2015 | Katada | | H02K 33/16 310/25 |
| 2015/0137628 A1* | 5/2015 | Endo | | H02K 33/16 310/25 |
| 2015/0194870 A1* | 7/2015 | Kim | | H02K 33/18 310/25 |
| 2016/0164389 A1* | 6/2016 | Jang | | H02K 7/116 310/20 |
| 2016/0173990 A1* | 6/2016 | Park | | H04R 9/043 381/354 |
| 2016/0218607 A1* | 7/2016 | Oh | | H02K 33/16 |
| 2017/0019011 A1* | 1/2017 | Wang | | H02K 33/16 |
| 2017/0033653 A1* | 2/2017 | Wang | | H02K 33/16 |
| 2017/0033657 A1* | 2/2017 | Mao | | H02K 33/16 |
| 2017/0033669 A1* | 2/2017 | Xu | | H02K 33/16 |
| 2017/0104401 A1* | 4/2017 | Umehara | | H02K 33/06 |
| 2017/0110920 A1* | 4/2017 | Mao | | H02K 1/34 |
| 2017/0214306 A1* | 7/2017 | Katada | | H02K 33/16 |
| 2017/0288519 A1* | 10/2017 | Kim | | H02K 33/00 |
| 2018/0021812 A1* | 1/2018 | Akanuma | | H02K 33/00 310/25 |
| 2018/0241295 A1* | 8/2018 | Zu | | H02K 33/14 |
| 2018/0250107 A1* | 9/2018 | Dai | | H02K 1/2791 |
| 2019/0044425 A1* | 2/2019 | Zu | | H02K 33/02 |
| 2019/0151895 A1* | 5/2019 | Takahashi | | H02K 33/18 |
| 2019/0206601 A1* | 7/2019 | Wauke | | H01F 7/0289 |
| 2020/0366177 A1* | 11/2020 | Maeda | | H02K 33/02 |
| 2021/0067021 A1* | 3/2021 | Maeda | | H02K 33/16 |
| 2021/0194342 A1* | 6/2021 | Kitahara | | H02K 33/18 |

\* cited by examiner

VIBRATION MOTOR WITH ELASTIC SUPPORT ARM WITH FLANGE

FIELD OF THE PRESENT DISCLOSURE

The present disclosure relates to motors, in particular to a vibration motor for providing tactile feedback.

DESCRIPTION OF RELATED ART

With the development of electronic technology, the silent prompts of incoming calls from mobile communication terminal devices such as mobile phones need to rely on the vibration of the body to remind users, and the vibration-generating parts are the built-in vibration motor, and the core of small medical and health care equipment such as vibration massagers the device is also a built-in vibration motor. The vibration motor generally comprises a vibrator and an elastic support accommodated in the housing. The elastic support is used to support and suspend the vibrator in the housing. In related technologies, when the structure of the elastic support is restricted and the vibration modal of the vibrator of the vibration motor is low, the support stiffness requirement cannot be satisfied.

SUMMARY OF THE PRESENT INVENTION

One of the objects of the present invention is to provide a vibration motor with an elastic supporting member having enhanced stiffness.

To achieve the above-mentioned objects, the present invention provides a vibration motor having a housing with an accommodation space; a vibrator located in the accommodation space and vibrating a long a vibration direction; a stator accommodated in the accommodation space; and an elastic support assembly suspending the vibrator in the accommodation space.

The elastic support assembly comprises at least one elastic support between the vibrator and the housing. The elastic support includes a first fixed part fixed on the vibrator, a second fixed part fixed on the housing and spaced from the first fixed part, a first elastic support arm connecting the first fixed part and the second fixed part and spaced from the vibrator, and a first flange formed by bending and extending from the first elastic support arm along a direction close to the vibrator or close to the housing. The first flange keeps a distance from the vibrator or the housing.

As an improvement, the housing comprises two first sidewalls arranged oppositely, two second sidewalls connected to the first sidewalls and arranged oppositely, a top wall covering the first sidewalls and the second sidewalls, and a bottom wall opposite to the top wall and spaced apart; the first elastic support arm comprises a first elastic support arm body between the vibrator and the first sidewall, and a first connection part connected to the second fixed part; and wherein the first flange locates on the first elastic support arm body or the first connection part.

As an improvement, the first flange is formed by bending and extending from an end of the first elastic support arm close to the top wall along a direction close to the vibrator or close to the first sidewall.

As an improvement, wherein the elastic support further comprises a second flange bending and extending from the end of the first elastic support arm close to the bottom wall in a direction toward the vibrator or close to the first sidewall.

As an improvement, the first flange forms a distance from the second flange.

As an improvement, the vibrator comprises a weight fixed to the first fixed part and connected to the elastic support assembly; the weight includes an accommodation cavity surrounding the stator, and a magnet accommodated in the accommodation cavity and arranged between the stator and the weight.

As an improvement, the stator comprises a coil bracket and a coil wound around the coil bracket; and an axial direction of the coil is parallel to the vibration direction of the vibrator.

As an improvement, the vibrator further comprises a yoke locating between the magnet and the weight.

As an improvement, the magnet comprises a first magnet arranged on opposite sides of the coil along the axis direction and a second magnet arranged along a direction perpendicular to the axis direction; a position of the weight corresponding to the second magnet sinks away from the stator to form a groove for receiving the second magnet.

As an improvement, the vibration motor further comprises a damping member sandwiched between the first elastic support arm and the vibrator.

As an improvement, the vibration motor further comprises a position limiting block assembly accommodated in the accommodation space for limiting the displacement of the vibrator; the position limiting block assembly comprises a first position limiting block and a second position limiting block spaced from the first position limiting block along the vibration direction.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
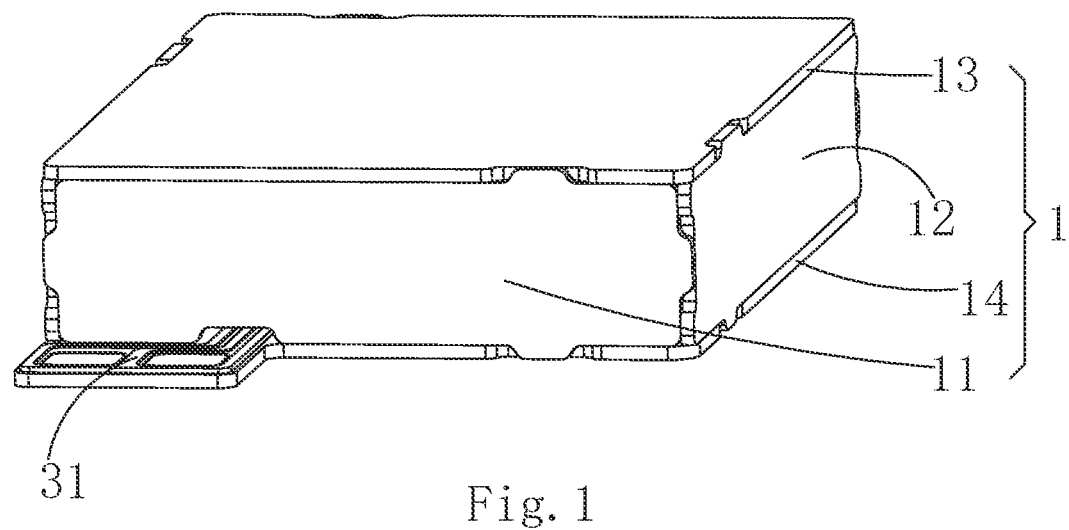
FIG. 1 is an isometric and assembled view of a vibration motor in accordance with an exemplary embodiment of the present disclosure.

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby is only to explain the disclosure, not intended to limit the disclosure.

Please refer to FIGS. 1-6, a vibration motor provided in an embodiment of the present invention comprises a housing 1 with an accommodation space 10 and a vibrator 2 and a stator 3 accommodated in the accommodation space 10. The vibration motor also comprises an elastic support assembly 5 that supports and suspends the vibrator 2 in the accommodation space 10 and provides the vibrator 2 with elastic restoring force.

Please further refer to FIGS. 2-6, the elastic support assembly 5 is set between the housing 1 and the vibrator 2. The elastic support assembly 5 comprises at least one elastic support 51 arranged between the vibrator 2 and the housing 1. In this embodiment, the elastic support assembly 5 comprises two elastic supports 51 arranged on opposite sides of the vibrator 2. Each elastic support 51 comprises a first fixed part 511 fixed on the vibrator 2 and a second fixed part 512 fixed on the housing 1, and a first elastic support arm 513 connecting the first fixed part 511 and the second fixed part 512. The first elastic support arm 513 and the vibrator 2 are arranged at intervals, and the first fixed part 511 and the second fixed part 512 are arranged at relatively intervals.

Figure 2:
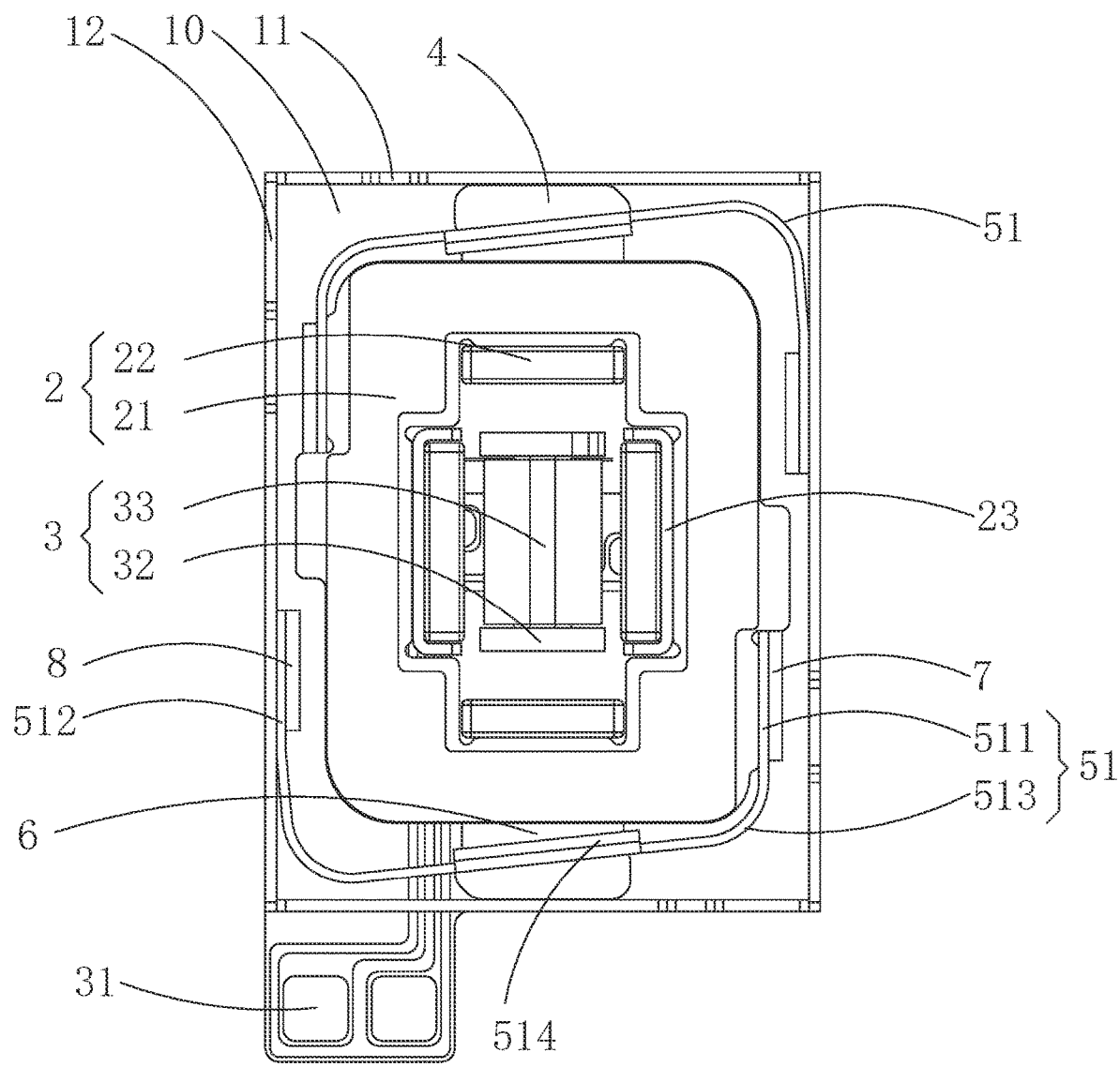
FIG. 2 is a top view of the vibration motor with a top wall removed.
Figure 3:
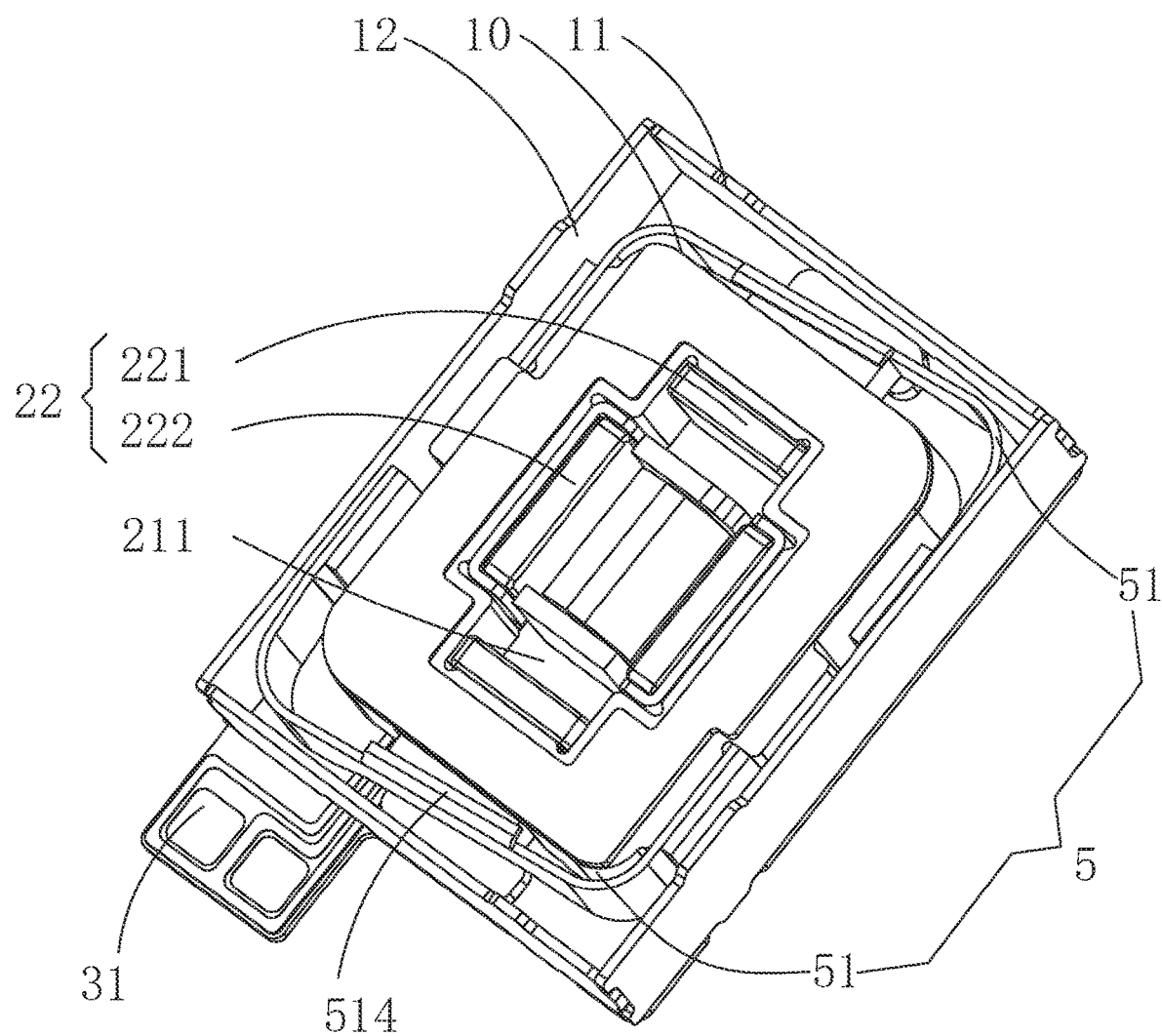
FIG. 3 is an isometric view of the vibration motor with a top wall removed.
Figure 6:
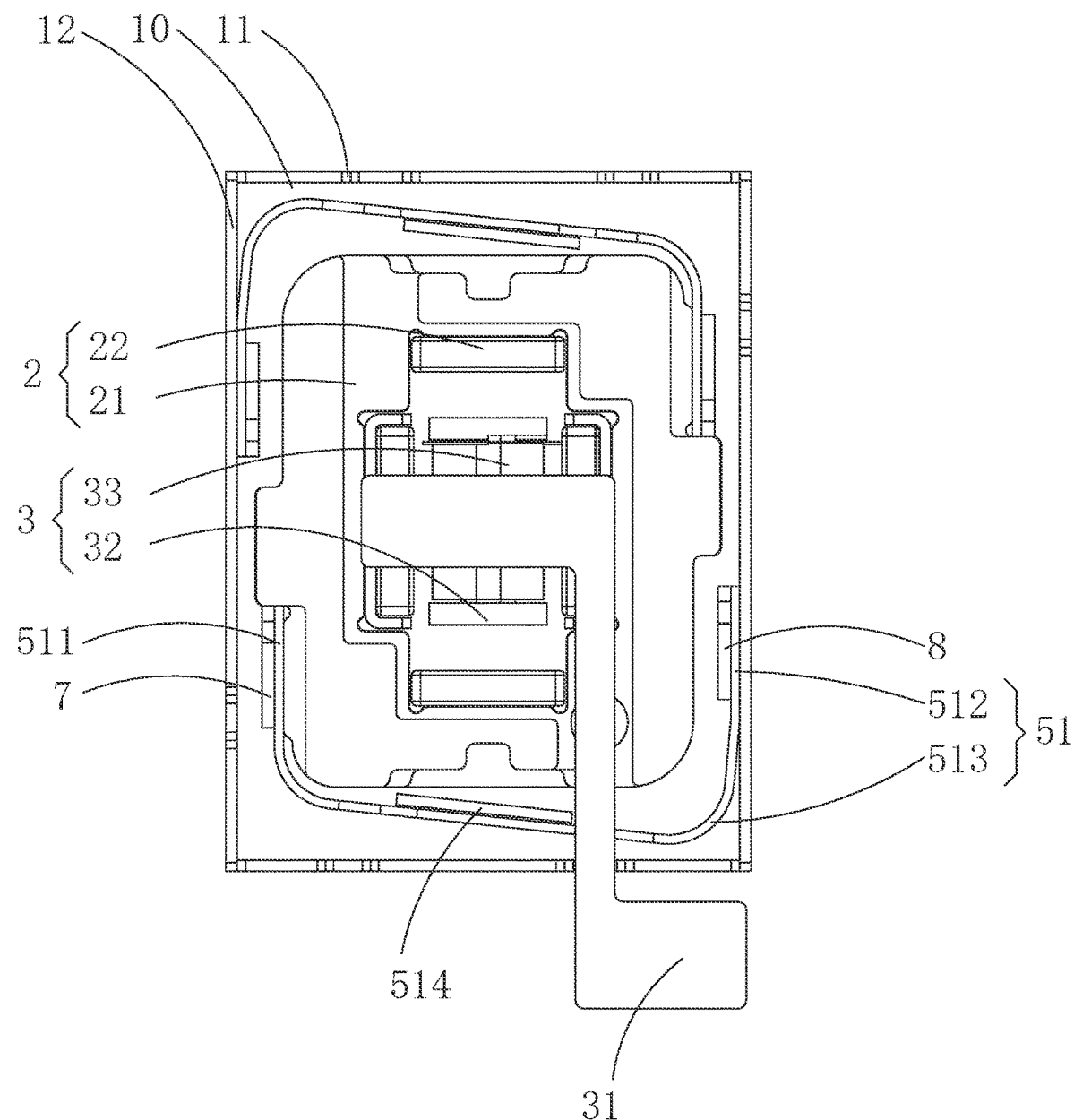
FIG. 6 is a bottom view of the vibration of the vibration motor with a bottom wall, a position limiting block, damping member removed.

Referring to FIGS. 2, 3, and 6, the elastic support 51 further comprises a first flange 514. The first flange 514 is formed by bending and extending from the first elastic support arm 513 toward the direction close to the vibrator 2 or the housing 1. The first flange 514 and the vibrator 2 or the housing 1 are arranged at intervals. In this embodiment, the first flange 514 extends in a direction close to the vibrator 2. By setting the first flange 514 to strengthen the elastic support assembly, it effectively increases the support stiffness of the elastic support assembly and improves the low-order mode of the vibration motor. Specifically, when the structure of the elastic support assembly 5 is restricted and the vibration motor is provided with a low operating mode (generally the first order), the operating frequency of the vibration motor can be increased. When the swing mode of the vibration motor is low, the support stiffness of the elastic support assembly 5 can be increased, which can effectively improve the swing mode and reduce the risk of anisotropic vibration.

In this embodiment, referring to FIGS. 1-6, the housing 1 comprises two first sidewalls 11 arranged oppositely, two second sidewalls 12 arranged oppositely, and a top wall 13 covering and connected to the first sidewall 11 and the second sidewall 12, and a bottom wall 14 opposite to the top wall 13 and spaced apart. That is, the two first sidewalls 11 bend and extend from the top wall 13 to the bottom wall 14 respectively. Two second sidewalls 12 respectively bend and extend from the top wall 13 to the bottom wall 14 and are connected to the first sidewall 11.

Between the first sidewall 11 and the second sidewall 12, between the first sidewall 11 and the second sidewall 12 and the top wall 13, and between the first sidewall 11 and the second sidewall 12 and the bottom wall 14, all connections are all fixed by welding. In some embodiments, it can also be fixed by bonding. In some embodiments, the first sidewall 11 and the second sidewall 12 may be integrally formed, that is, the first sidewall 11 and the second sidewall 12 are integrally formed peripheral wall. In some embodiments, the first sidewall 11 and the second sidewall 12 may be integrally formed with the top wall 13, and the bottom wall 14 is a single integral body. When installing, cover the bottom wall 14 on the first sidewall 11 and the second sidewall 12 and fix it. In other embodiments, the first sidewall 11 and the second sidewall 12 may also be integrally formed with the bottom wall 14. When installing, cover the top wall 13 on the first sidewall 11 and the second sidewall 12 and fix it.

Figure 7:
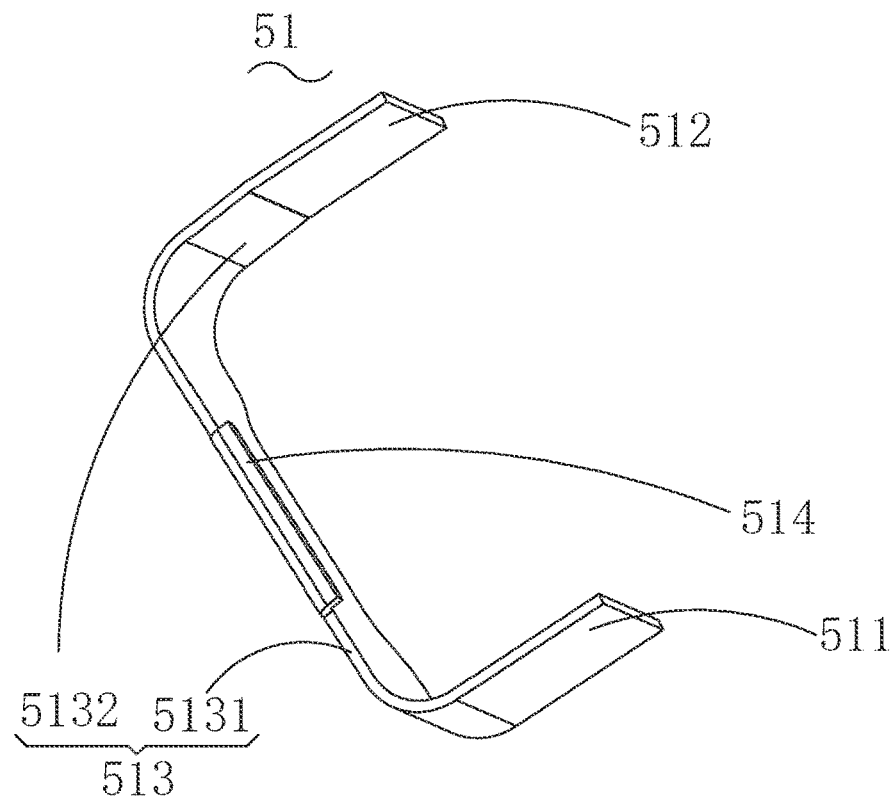
FIG. 7 is an isometric view of a first elastic support of the vibration motor.
Figure 8:
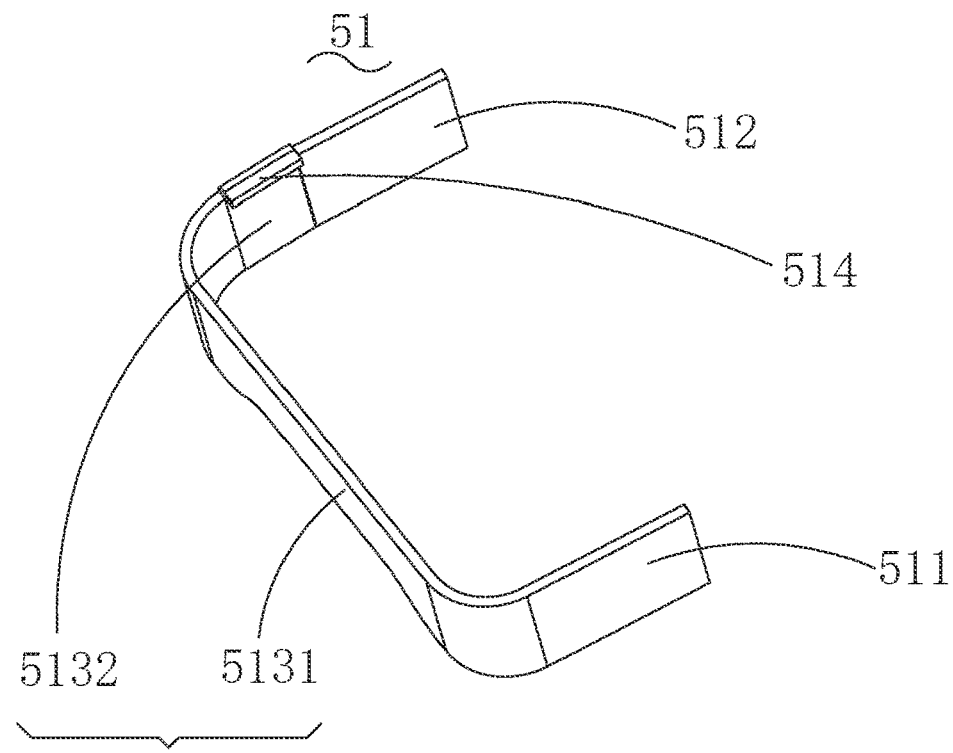
FIG. 8 is an isometric view of another optional first elastic support provided.

Referring to FIGS. 3, 7, and 8, the first elastic support arm 513 comprises a first elastic support arm body 5131 and a first connection part 5132 connected to the second fixed part 512. The first elastic support arm body 5131 is provided between the vibrator 2 and the first sidewall 11. Please refer to FIG. 7, the first flange 514 is provided on the first elastic support arm body 5131. Alternatively, please refer to FIG. 8, the first flange 514 is provided on the first connection part 5132.

Referring to FIGS. 3, 7, and 8, the first flange 514 is formed by bending and extending from the end of the first elastic support arm 513 close to the top wall 13 towards the direction close to the vibrator 2 or close to the first sidewall 11.

Figure 9:
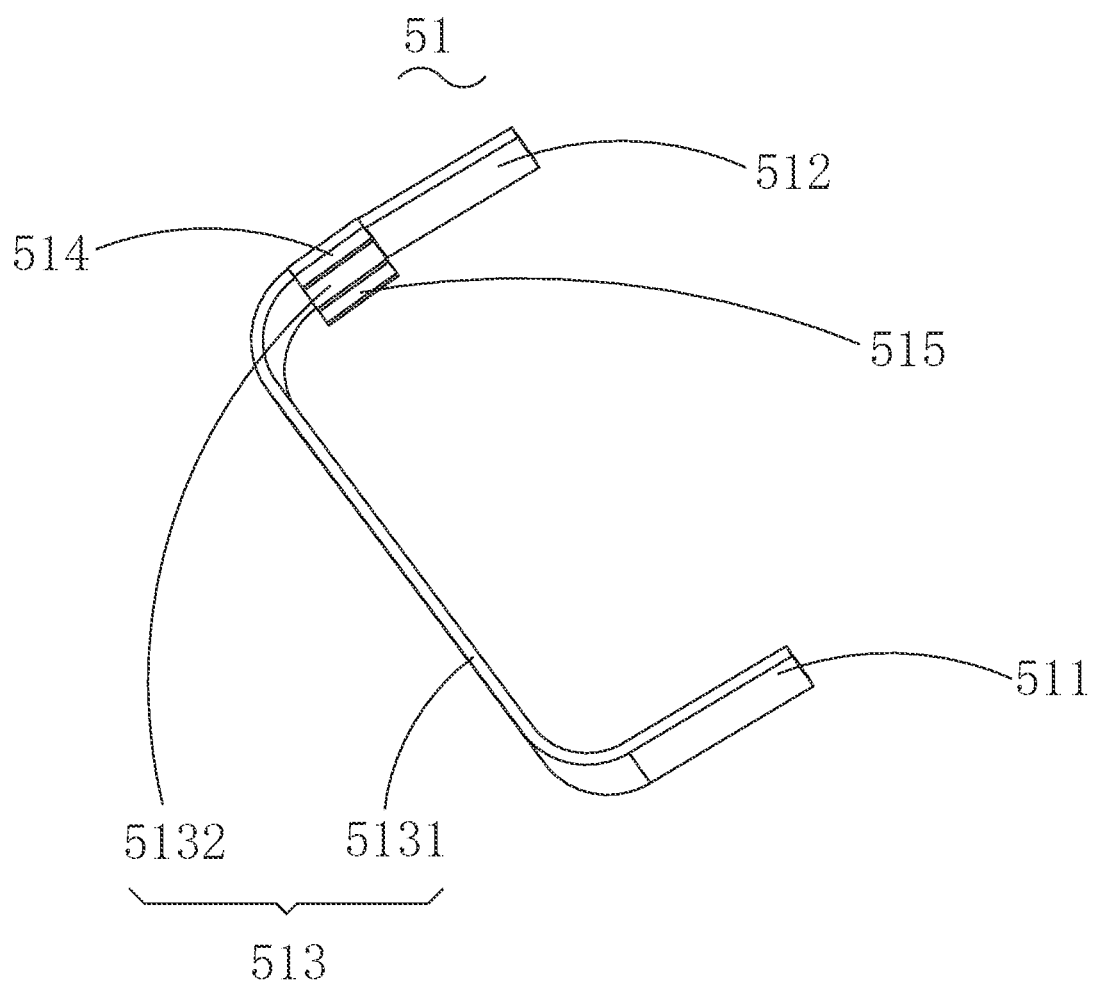
FIG. 9 is an isometric view of another optional first elastic support provided.

Further, referring to FIG. 9, the elastic support 51 further comprises a second flange 515. The second flange 515 bends and extends from an end of the first elastic support arm 513 close to the bottom wall 14 toward the direction close to the vibrator 2 or the first sidewall 11. The first flange 514 and second flange 515 are arranged at a relative interval to further increase the support rigidity of the elastic support assembly.

Optionally, the first elastic support 51 is integrally formed to provide the vibrator 2 with support rigidity required for vibration work. In this embodiment, the two first elastic supports 51 are centrally symmetrically arranged between the housing 1 and the vibrator 2.

The vibrator 2 comprises weight 21 and magnet 22. The weight 21 is connected to the elastic support assembly 5 and is provided with an accommodation cavity 211. The stator 3 is accommodated in the accommodation cavity 211 and is spaced apart from the vibrator 2. The magnet 22 is accommodated in the accommodation cavity 211 and arranged between the stator 3 and the weight 21. The first fixed part 511 is fixed to the weight 21.

In addition, the vibration motor also comprises a first fixing sheet 7 attached to the side of the first fixed part 511 away from the vibrator 2, and a second fixing sheet 8 attached to the side of the second fixed part 512 away from the second sidewall 12. The first fixed part 511 is fixed on the sidewall of the vibrator 2 through the first fixing sheet 7. The second fixed part 512 is fixed on the second sidewall 12 through the second fixing sheet 8. The first fixed part 511 and the sidewall of the vibrator 2 and the second fixed part 512 and the second sidewall 12 are fixed firmly.

Please refer to FIGS. 2 and 6, the stator 3 comprises a coil bracket 32 and a coil 33. The coil 33 is wound on the coil bracket 32, and the coil 33 is wound to form a coil through hole. The axial direction of the coil 33 is parallel to the vibration direction of the vibrator 2, that is, the coil through hole faces the first elastic support arm 513.

Further, the stator 3 further comprises a circuit board 31. The circuit board 31 and the coil 33 are electrically connected. The circuit board 31 is set on the top wall 13 or bottom wall 14 of the housing. In this embodiment, the circuit board 31 is set on the bottom wall 14 of the housing.

The vibrator 2 further comprises a yoke 23 arranged between the magnet 22 and the weight 21. Further, the magnet 22 comprises a first magnet 221 arranged on opposite sides of the coil 33 along its axis direction, and a second magnet 222 arranged on the coil 33 along the axis direction perpendicular to the coil 33. The position of the weight 21 corresponding to the second magnet 222 sinks away from the stator 2 to form a groove. The second magnet 222 is accommodated in the groove. In this embodiment, the second magnet is arranged in the groove and the yoke 24 is arranged between the second magnet 222 and the weight 21.

A damping member 6 is sandwiched between the first elastic support arm 513 and the vibrator 2. Further, the damping member 6 is sandwiched between the first elastic support arm 513 and the weight 21. Specifically, the side of the weight 21 close to the first elastic support arm 513 sinks in a direction away from the first elastic support arm 513 to form a second groove for accommodating the damping member 6. The damping member 6 is at least partially accommodated in the second groove.

The damping member 6 is made of elastic material. The damping member 6 in this embodiment is foam. In other embodiments, it may also be an elastic material such as silica gel. When the vibration amplitude of vibrator 2 is too large, damping member 6 contacts the first elastic support arm 513, and damping member 6 provides a buffering effect. The maximum amplitude of vibrator 2 can be limited to achieve the effect of controlling the vibration of the motor.

Figure 4:
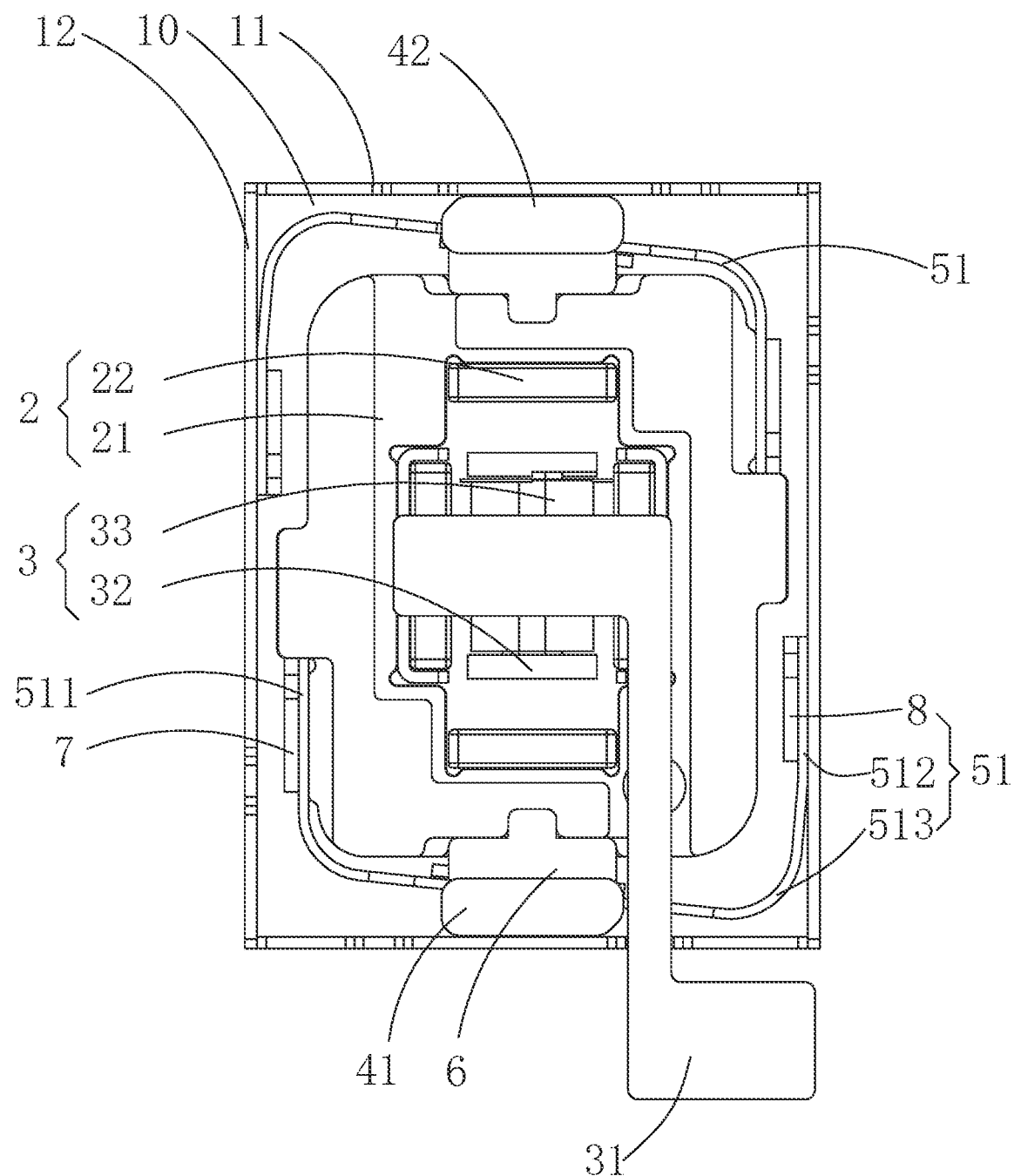
FIG. 4 is a bottom view of the vibration motor with a bottom wall removed.
Figure 5:
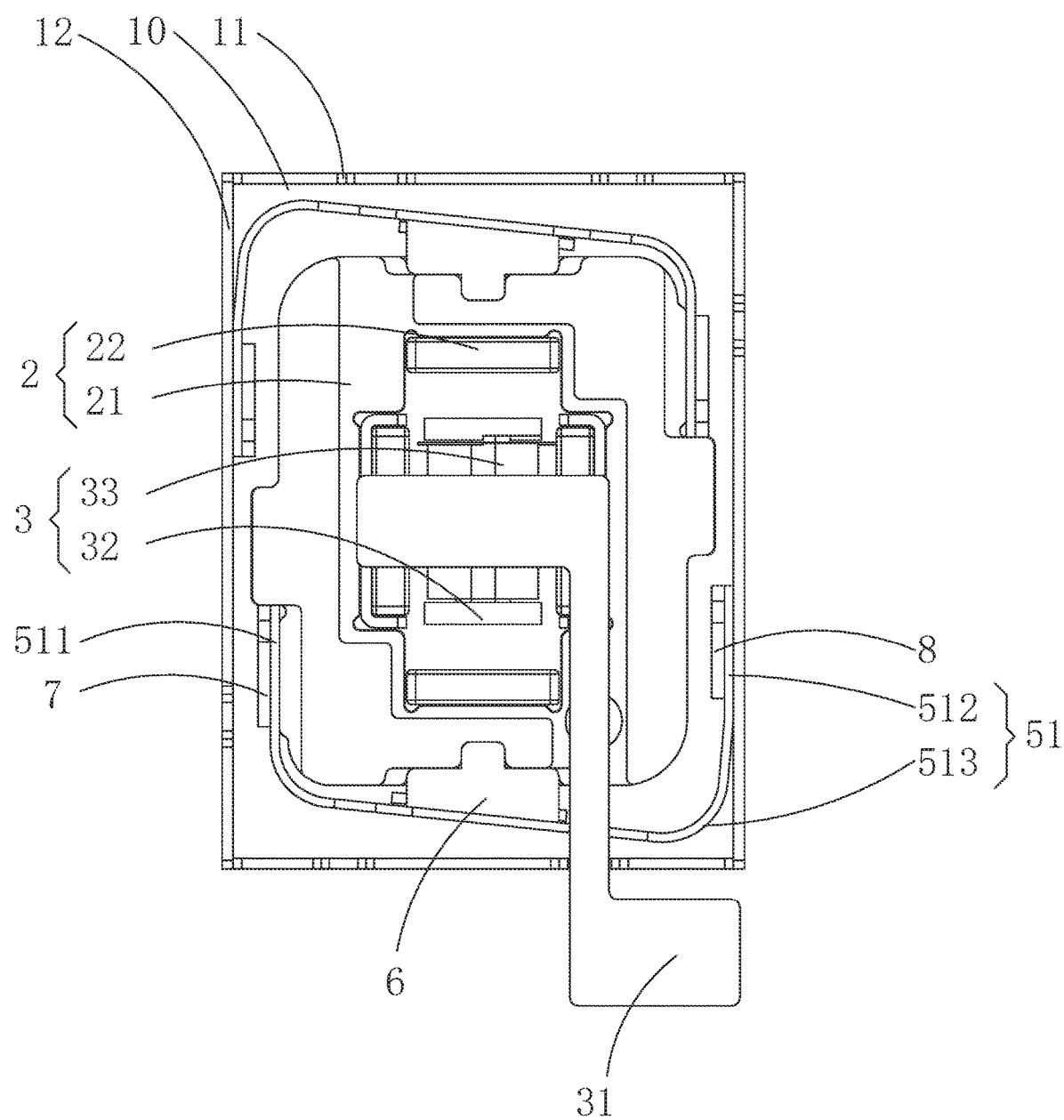
FIG. 5 is a bottom view of the vibration of the vibration motor with a bottom wall and a position limiting block removed.

Please refer to FIGS. 2 and 4, the vibration motor further comprises a position limiting block assembly 4 that is accommodated in the accommodation space 10 and used to limit the displacement of the vibrator 2. The position limiting block assembly 4 comprises a first position limiting block 41 and a second position limiting block 42 which are arranged at intervals along the vibration direction of the vibrator 2. The first position limiting block 41 and the second position limiting block 42 are fixed on the bottom wall 14. The first position limiting block 41 and the second position limiting block 42 are connected to the adjacent first sidewall 11 respectively.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor, comprising:
    a housing with an accommodation space, comprising:
        two first sidewalls arranged oppositely;
        two second sidewalls connected to the first sidewalls and arranged oppositely;
        a bottom wall opposite to a top wall and spaced apart;
    a vibrator located in the accommodation space and vibrating a long a vibration direction;
    a stator accommodated in the accommodation space;
    an elastic support assembly suspending the vibrator in the accommodation space, comprising at least one elastic support between the vibrator and the housing;
    the elastic support including:
        a first fixed part fixed on the vibrator;
        a second fixed part fixed on the housing; and spaced from the first fixed part;
        a first elastic support arm connecting the first fixed part and the second fixed part, and spaced from the vibrator;
        a first flange formed by bending and extending from the first elastic support arm along a direction close to the vibrator or close to the housing; wherein
    the first flange keeps a distance from the vibrator or the housing;
    the first elastic support arm comprises a first elastic support arm body between the vibrator and the first sidewall, and a first connection part connected to the second fixed part; and the first flange locates on the first elastic support arm body or the first connection part;
    the first flange is formed by bending and extending from an end of the first elastic support arm close to the top wall along a direction close to the vibrator or close to the first sidewall.

2. The vibration motor as described in claim 1 further comprising a damping member sandwiched between the first elastic support arm and the vibrator.

3. The vibration motor as described in claim 1, further comprising a position limiting block assembly accommodated in the accommodation space for limiting the displacement of the vibrator; the position limiting block assembly comprises a first position limiting block and a second position limiting block spaced from the first position limiting block along the vibration direction, and.

4. The vibration motor as described in claim 1, wherein the elastic support further comprises a second flange bending and extending from the end of the first elastic support arm close to the bottom wall in a direction toward the vibrator or close to the first sidewall.

5. The vibration motor as described in claim 4, wherein the first flange forms a distance from the second flange.

6. The vibration motor as described in claim 1, wherein the vibrator comprises a weight fixed to the first fixed part and connected to the elastic support assembly; the weight includes an accommodation cavity surrounding the stator, and a magnet accommodated in the accommodation cavity and arranged between the stator and the weight.

7. The vibration motor as described in claim 6, wherein the stator comprises a coil bracket and a coil wound around the coil bracket; and an axial direction of the coil is parallel to the vibration direction of the vibrator.

8. The vibration motor as described in claim 7, wherein the vibrator further comprises a yoke locating between the magnet and the weight.

9. The vibration motor as described in claim 8, wherein the magnet comprises a first magnet arranged on opposite sides of the coil along the axis direction and a second magnet arranged along a direction perpendicular to the axis direction; a position of the weight corresponding to the second magnet sinks away from the stator to form a groove for receiving the second magnet.

* * * * *